Sept. 4, 1934.    P. SUBKOW    1,972,833
CONTINUOUS PROCESS FOR MAKING CARBURETED WATER GAS
Original Filed Oct. 17, 1925
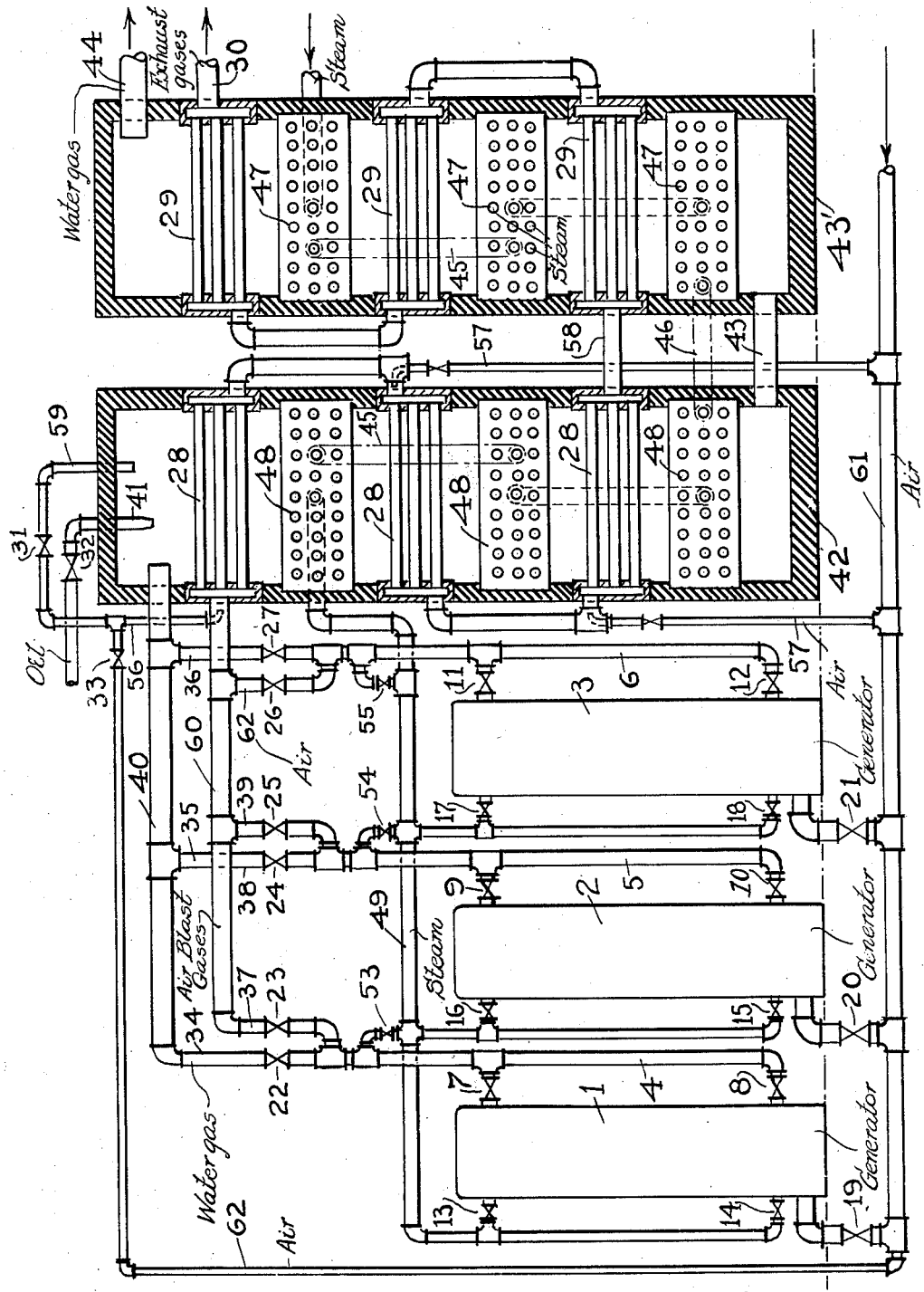
Philip Subkow Patented Sept. 4, 1934

1,972,833

UNITED STATES PATENT OFFICE 1,972,833

CONTINUOUS PROCESS FOR MAKING CARBURETED WATER GAS

Philip Subkow, Los Angeles, Calif.

Application October 17, 1925, Serial No. 63,014
Renewed April 6, 1932

27 Claims. (Cl. 48—208)

This invention pertains to a process for making gas and more particularly for making water gas.

The process of water gas manufacture comprises usually three reactions. The reaction of carbonaceous material with air which is exothermic; the reaction of the thus heated material with steam which is endothermic, and the carburetion of the gases formed in the last reaction. This latter reaction involving as it does vaporization of the oil with incidental cracking of the oil is largely endothermic.

In order to carry out this process it has been usual to operate the above process in the aforementioned three distinct stages. The first two are carried out in a generator where a period of air blasting is followed by a period of steam injection. The blast gases are in effect producer gases. The gases formed during the steaming period are termed water gas and are carbureted with oil in a separate chamber called a carburetor, and are further fixed in a superheater. In order to provide the heat necessary for the carburetion step the process is usually run in stages. The gases formed in the blasting period are run through the brick checkerworks of the carburetor and superheater, and then the air admitted to the generator is cut off and steam is run first up and then down through the generator each for usually equal periods.

The water gases thus formed are passed into the carburetor where they meet a spray of oil and the mixed oil vapors and water gas pass through the superheater where the cracking reaction proceeds to the desired completion. It is thus seen that the carburetor and superheater function both as an oil cracking and vaporization chamber and a regenerator wherein the heat of the blast gases are stored to be used in the cracking and vaporizing reaction.

The apparatus is thus composed of a generator, a carburetor and a superheater. Additional economy has been recently realized by the so-called "back run" process. This process is characterized by passing the steam used in the down run entirely through the apparatus, that is, through the whole of the superheater, the carburetor and then down through the incandescent fuel bed in the generator. The water gas thus formed is drawn off through a special outlet in the bottom of the generator. The steam is thus superheated by the heat stored in the apparatus. This down run water gas is uncarbureted and the up run period more heavily carbureted, and the gases used to give the desired B. t. u. and luminosity.

The process of the present invention is an improvement on the ordinary water gas process and on the back run process and is characterized by the fact that water gas is independently and continuously generated and independently and continuously carbureted.

It is an object of my invention to utilize the conventional method of generation of water gas, that is, in an alternate air blow and up and down steam run generation process.

It is another object of my invention to cause a continuous flow of blast and water gases in direct heat exchange and a continuous carburetion of said water gases.

It is another object of my invention to cause a continuous flow of and direct heat exchange of steam used in said continuous water gas generator with said blast gases and said water gases.

It is another object of my invention to utilize a plurality of generators in combination with one carburetor.

It is another object of my invention to cause the heat exchange between blast and water gases on the recuperator principle.

It is another object of my invention to preheat the steam used in said process by means of the heat contained in the blast and water gases.

It is another object of my invention to operate the carburetor at a constant high temperature, sufficiently high to form aromatic and cracked hydrocarbons from oil, and preferably heavy oils.

Other objects will be apparent from the description which follows and from the drawing which is diagrammatic showing parts in elevation and in section and not to scale.

In the single figure 1, 2 and 3 are water-gas generators having beds of solid fuel which may all be of the up and down alternating run type, wherein 19, 20 and 21 are the blast air inlets, and 13, 16 and 17 are the down run steam inlets, and 14, 15 and 18 are the up run steam inlets. The gases generated on the up run exit via 7, 9 and 11 and the gases generated on the down run exit via 8, 10 and 12. The invention does not reside in the type of generator employed and any type, either alternate or continuously steamed type may be used. In the specific embodiment here illustrated, I utilize the conventional alternate up and down run type because it is standard American practice.

The air blast gases generated during the blast period pass via valves 23, 25 and 26 and water gas formed during the up and down run steam runs pass via valves 22, 24 and 27.

The steam passes through coils 47 and 48 in the superheater and carburetor preferentially in a counter direction to the flow of the heated blast and water gases. The steam then passes into the manifold 49 and thence to be used in the run periods of gas making. It will be observed that during the run periods, that is, the up steam run and the down steam run, the steam is superheated by having passed through the apparatus in heat exchange with the hot gases.

The blast gases as they enter 28 meet a supply of air via 56 which may also be preheated in a manner analogous to the steam by counter current flow in direct heat exchange with the gases.

The air is preferentially insufficient to cause complete combustion. Secondary air to complete the combustion of the blast gases may be introduced at several points along its path through the tubes such as at 57. This air may also be heated if desired. The products of combustion pass through 58 and out through tubes 29 in the superheater and out through 30 to heat recovery devices, such as heat exchangers, waste heat boilers, and the like. Because there is a constant flow of blast gases through the tubes 28, 29 and 30 no by-passing through a stack, not shown, with its consequent waste of heat is necessary except perhaps on starting. The water gases pass via the manifold 40 into the carburetor 42 and around the tubes 28, 48 and through the pipe 43 and up the superheater 43' around the tubes 29 and 47 through the pipe 44 to the usual cooling devices, not shown. In the carburetor 42 the water gases meet a blast of oil via the pipe 41 controlled by valve 32. Additional steam may be injected with the oil. The oil is partially vaporized by the hot water gas and further vaporized and cracked by the hot tubes 28, and the reaction is completed in the superheater where the oil and water gas again meet the tubes 29. The heat exchange which superheats the steam in both the superheater and carburetor is both by convection from the water gases and by radiation from the tubes through which the burning blast gases pass. The temperature of the water gases is usually below that of the blast gases. The temperature of the blast gases is additionally raised by their combustion. The vaporization and cracking of the oil being endothermic also tends to lower the temperature of the water gases. The water gases, oil and oil-vapor passing over the hot tubes 28 absorb heat therefrom. Their passing over the tubes 48 impart heat to the relatively cool steam superheating the steam. They then pass over a second bank of tubes 28 where they extract heat from the burning blast gases. It is thus seen that the water gases act as a heat convecting medium from the blast gas tubes to the steam tubes 48. Additional to this there is a direct passage of heat from the tubes 28 and 29 to the tubes 47 and 48 by means of radiation.

One modification of the process is to generate steam in the flash boiler principle using the first part of the coils 29 as the flash boiler.

There is an additional advantage in such a process. The present systems of water gas manufacture depend upon the regenerative principle as a means of conveying heat from the blast gases to the water gas. The consequence of this is a large fluctuation in temperature during the run and blast periods. The temperature being highest at the beginning of the run and the end of the blast and falling during the run period. This gives uneven carburetion and puts a strain upon the apparatus. In the present system there is a constant temperature in the superheater and carburetor with a consequent economy in the use of oil and a constant quality of gas.

It may be found advisable to introduce steam into the water gas entering into the carburetor to aid in the cracking action and also to prevent or remove any carbon that may be deposited in the carburetor as a result of cracking. By-passes 53, 54 and 55 are provided for that purpose. An auxiliary air inlet 59 controlled by valve 31 may be provided in the carburetor for cleaning purposes or other purposes as may be desired. Additional steam inlets for cleaning may also be provided.

This system of operation enables the use of a plurality of generators with one superheater and one carburetor. In view of the fact that the air blast period is always less than the run period in modern practice, I have found it advisable to use at least three generators with one superheater. Thus if two generators be used, the total length of the run periods must be equal to the blow period. This is impractical since it would result in too high a temperature in the generator and too short a run period. Thus with a two minute blast period and two minute up run periods and two minute down run periods it is advisable to use three generators, one on blast and two on steam at any one time. As an illustration the following cycle may be described. Thus generators 1 and 2 are started simultaneously, generator 1 on blast and generator 2 on steam. At the end of two minutes generator 1 is put on steam and generator 3 on blast. At the end of the next two minutes generator 2 is put on blast and generator 3 on steam. At the end of the next two minutes generator 1 is put on blast and generator 2 on steam. Thus there are two generators on steam and one on blast. The generators on steam may be both on up or down runs or the one may be on up and the other on down run.

*Scheme of cycle: One generator on blast, two on steam*

[U.R.=up run; D.R.=down run]

|  | First 2 minutes | Second 2 minutes | Third 2 minutes |
|---|---|---|---|
| Generator 1 | Blast | Steam (U. R.) | Steam (D. R.) |
| Generator 2 | Steam (U. R.) | Steam (D.R.) | Blast |
| Generator 3 | Steam (D. R.) | Blast | Steam (U. R.) |

Obviously more than three generators may be run, as for example four generators.

|  | First 2 minutes | Second 2 minutes | Third 2 minutes |
|---|---|---|---|
| Generator 1 | Blast | Steam (U. R.) | Steam (D. R.) |
| Generator 2 | Steam (D. R.) | Blast | Steam (U. R.) |
| Generator 3 | Steam (U. R.) | Steam (D. R.) | Blast |
| Generator 4 | Steam (D. R.) | Blast | Steam (U. R.) |

For five generators the cycle is as follows:

|  | First 2 minutes | Second 2 minutes | Third 2 minutes |
|---|---|---|---|
| Generator 1 | Blast | Steam (U. R.) | Steam (D. R.) |
| Generator 2 | Steam (D. R.) | Blast | Steam (U. R.) |
| Generator 3 | Steam (U. R.) | Steam (D. R.) | Blast |
| Generator 4 | Steam (D. R.) | Blast | Steam (U. R.) |
| Generator 5 | Blast | Steam (U. R.) | Steam (D. R.) |

An example will be given showing the use of a plurality of generators when the steam periods are different from the blast period, for example with a three minute blast and with a 2½ minute up and a 2½ minute down steam run, the cycle will be as follows:

1. Blast 3 minutes. 2½ min. steam U. R. Steam 2½ min. D. R.
2. Steam U. R. 2½ min. Steam D. R. 2½ min. Blast 3 minutes.
3. Steam D. R. 2½ min. Blast 3 minutes. Steam U. R. 2½ min.

It is thus seen that by regulating the number of generators employed and the blast and run periods the ratio of volumes of blast gas to water gases passing through the apparatus may be regulated for different periods or for the whole process and the heat exchange also accordingly regulated.

This process because of its uniformity and constant high temperature of operation allows considerable saving in oil. The high temperature of the tubes and high temperature of the water gases make for considerable formation of aromatic hydrocarbons and other cracked hydrocarbons which when removed from the carbureted water gas by condensation or scrubbing yield a valuable motor fuel. The use of heavier oils is permissible because any carbonization tendency is counteracted by the presence of the water gas and any additional steam that is injected with the gases and (or) with the oil.

This apparatus is extraordinarily flexible with great economy in heat and large reduction in the apparatus required for the generation of an amount of gas equal to that generated in one unit of the present systems. Thus, whereas one carburetor and one superheater serve at present one generator, in the system herein described, one carburetor and one superheater may serve several generators, preferably three or more.

Another feature is the absence of checkerwork in the superheater and carburetor resulting in a diminished cost in construction and a diminished cost in operation since it reduces both repair and the back pressure resulting from checkerwork. Checkerwork or baffling if desired may, of course, be employed in order to increase the heat exchange, oil vaporization and cracking efficiency of the process.

The above illustration is not limiting, but merely descriptive of the best manner of carrying out my invention which is claimed in the appended claims.

I claim:

1. A continuous carbureted water gas process operating with an odd number of generators, comprising generating producer gas, and generating water gas at alternate periods in a plurality of generators, the length of the producer gas generating period being of shorter duration than the water gas generating period, and continuously carbureting said water gas in a single carburetor.

2. In the process defined in claim 1, combusting said producer gas to generate the heat required for said carbureting step.

3. In the process defined in claim 1, combusting said producer gas to provide the heat of said carbureting step by passing said combusted producer gas in heat exchange relationship with said water gas in said carbureting step.

4. A continuous carbureted water gas process operating with an odd number of generators, which comprises generating producer gas and generating water gas in alternate periods in a plurality of generators, the length of the producer gas generating period being of shorter duration than the water gas generating period, combusting said producer gas, passing the products of combustion of said producer gas in heat exchange relationship with said water gas, and simultaneously treating said water gas with oil to vaporize said oil in a single treating chamber, thereby forming a mixture of said oil vapor and said water gas.

5. In the process defined in claim 4, passing said mixture of oil vapor and water gas through a superheater in heat exchange relationship with said combusted producer gases.

6. A continuous carbureted water gas process operating with an odd number of generators, comprising generating producer gas and generating water gas in alternate periods in a plurality of generators, the length of the producer gas generating period being of shorter duration than the water gas generating period, combusting the producer gas, continuously carbureting the water gas in a single carburetor, and preheating the steam required for said process by heat exchange with said combusted producer gas and said water gas.

7. A water gas process comprising an air blow period and an up and a down run steaming period, generating producer gas on the air blow period and water gas on the up and down run steaming periods in a plurality of generators, combusting said producer gas, continuously carbureting said water gas in a single carburetor, and passing said steam required in said process in heat exchange with said combusted producer gas and with said water gas.

8. An alternate blast, run gas process operating in a water gas set, generating air blast gas and water gas, comprising combusting blast gases, continuously carbureting said water gases, and superheating the steam required for said process by continuously passing steam in heat exchange with said combusted blast gases and said water gases.

9. A process for producing carbureted water gas in a water gas set comprising a generator having a bed of solid fuel and a single carburetor which process comprises blasting the fuel bed with air to incandescence to produce air blast gases and then following the air blast with an up and down water gas run in succession by alternately and successively blasting the fuel bed with steam in an up and a down run in succession and thereby generating water gas on both the up and the down run, passing the hot water gas undiluted with blast gases into a carburetor and enriching the water gas with oil in said carburetor at an elevated temperature sufficient to carburet said water gas and simultaneously during said carburetion and said water gas generation passing the steam used in both the up and down run water gas generation steps through said set in direct heat exchange with the gases in said carburetor to superheat said steam.

10. A process for producing carbureted water gas in a water gas set comprising a generator having a bed of solid fuel and a single carburetor which process comprises blasting the fuel bed with air to incandescence to produce air blast gases and then following the air blast with an up and down water gas run in succession by alternately and successively blasting the fuel bed with steam in an up and a down run in succession and thereby generating water gas on both the up and the down run, passing the hot water gas undiluted with blast gases into a carburetor and enriching the water gas with oil in said carburetor at an elevated temperature sufficient to carburet said water gas and simultaneously during said carburetion and said water gas generation passing the steam used in both the up and down run water gas generation steps through said set in heat exchange with air blast gases generated in said generator to superheat said steam.

11. A continuous carbureted water gas process which comprises continuously forming producer gas, continuously forming water gas in separate generators, combusting said producer gas, passing said products of combustion in heat exchange relation with said water gas and simultaneously treating said water gas with oil to vaporize the said oil forming a mixture of said oil vapor and said water gas, and preheating the steam required for said process by heat exchange relationship with said water gas and said products of combustion.

12. A continuous carbureted water gas process which comprises continuously forming producer gas, continuously forming water gas in separate generators, combusting said producer gas, passing said products of combustion in heat exchange relationship with said water gas, and simultaneously treating said water gas with oil to vaporize the said oil forming a mixture of said oil vapor and said water gas, passing said mixture through a superheater in heat exchange relationship with said combusted producer gases, and preheating the steam required for said process by heat exchange by said combusted blast gases and said water gases in the superheater and in the oil vaporizing step.

13. A process of continuously producing carbureted water gas in a set comprising a plurality of generators having beds of solid fuel and a single carburetor; blasting the fuel beds with air to incandescence, alternately blasting the fuel beds with superheated steam, and thereby continuously generating water gas, continuously passing the generated water gas into the carburetor and enriching with oil, and simultaneously passing the steam through the carburetor to superheat it.

14. A water gas process comprising an air blow period and an up and a down run steaming period, generating producer gas on the blow period and water gas on the steaming periods, and preheating the steam used for the up and down run steaming periods by direct heat exchange with said producer gas.

15. In the process defined in claim 14, carbureting the water gas formed on both the up and the down run steaming periods.

16. A water gas process comprising an air blow period and an up and down run steaming period, generating producer gas on the blow period and water gas on the steaming period, combusting said producer gas, and preheating the steam used for the up and down run steaming periods by direct heat exchange with said combusted producer gases.

17. In the process defined in claim 16, carbureting the water gas formed on the up and the down run steaming periods.

18. A water gas process comprising an air blow period and an up and a down run steaming period, generating producer gas on the blow and water gas on the steaming periods, and preheating the steam used for the up and down run steaming periods by passing steam and said producer gas in countercurrent passage in direct heat exchange.

19. In the process defined in claim 18, carbureting the water gas formed on both the up and the down run steaming periods.

20. A water gas process comprising an air blow period and an up and down run steaming period, generating producer gas on the blow and water gas on the steaming period, combusting said producer gas, and preheating the steam used for the up and down run steaming periods by passing steam and said combusted producer gas in countercurrent passage in direct heat exchange.

21. In the process defined in claim 20, carbureting the water gas formed on the up and the down run steaming periods.

22. A water gas process comprising an air blow period and an up and down run steaming period, generating producer gas on the blow period and water gas on the steaming period and superheating the steam used for the up and down run steaming periods by direct heat exchange with said water gas.

23. In the process defined in claim 22, carbureting the water gas formed on both the up and down run steaming periods.

24. A water gas process comprising an air blow period and an up and down run steaming period, generating producer gas on the blow period and water gas on the up and down run steaming periods, combusting said producer gas, continuously carbureting said water gas, and passing said steam required in said process in direct heat exchange with said combusted producer gas and with said water gas.

25. A continuous carbureted water gas process which comprises continuously forming producer gas, continuously forming water gas, combusting said producer gas, passing said products of combustion in heat exchange relationship with said water gas, and simultaneously treating said water gas with oil to vaporize the said oil forming a mixture of said oil vapor and said water gas, and preheating the steam required for said process by direct heat exchange relationship with said water gas and said products of combustion.

26. A continuous carbureted water gas process which comprises continuously forming producer gas, continuously forming water gas, combusting said producer gas, passing said products of combustion in heat exchange relationship with said water gas, and simultaneously treating said water gas with oil to vaporize the said oil forming a mixture of said oil vapor and said water gas, passing said mixture through a superheater in heat exchange relationship with said combusted producer gases, and preheating the steam required for said process by direct heat exchange with said combusted blast gases and said water gases in the superheater and in the oil vaporizing step.

27. A continuous carbureted water gas process comprising generating producer gas and generating water gas in alternate periods, the length of the producer gas generating period being of shorter duration than the water gas generating period, combusting the producer gas, continuously carbureting the water gas, and preheating the steam required for said process by direct heat exchange with said combusted producer gas and said water gas.

PHILIP SUBKOW.